US011272752B2

(12) United States Patent
Salvetti et al.

(10) Patent No.: US 11,272,752 B2
(45) Date of Patent: Mar. 15, 2022

(54) DEVICE FOR CONNECTING A LINING LAYER OF A HELMET TO AN INNER SHOCK-ABSORBING PORTION OF A HELMET

(71) Applicant: NOLANGROUP S.P.A., Brembate di Sopra (IT)

(72) Inventors: Alberto Salvetti, Bergamo (IT); Danilo Ferreri, Brembate di Sopra (IT)

(73) Assignee: NOLANGROUP S.P.A., Brembate di Sopra (BG) (IT)

( * ) Notice: Subject to any disclaimer, the term of this patent is extended or adjusted under 35 U.S.C. 154(b) by 912 days.

(21) Appl. No.: 15/136,354

(22) Filed: Apr. 22, 2016

(65) Prior Publication Data

US 2016/0316846 A1    Nov. 3, 2016

(30) Foreign Application Priority Data

Apr. 29, 2015   (IT) .......................... MI2015A000610

(51) Int. Cl.
*A42B 3/12*      (2006.01)
*A42B 3/04*      (2006.01)
*A42B 3/10*      (2006.01)
*F16B 5/06*      (2006.01)
*F16B 25/00*     (2006.01)

(52) U.S. Cl.
CPC ................ *A42B 3/125* (2013.01); *A42B 3/04* (2013.01); *A42B 3/10* (2013.01); *F16B 5/0621* (2013.01); *F16B 25/0015* (2013.01)

(58) Field of Classification Search
CPC .......... A42B 3/12; A42B 3/125; A42B 3/127; A44B 17/0029; F16B 5/02
See application file for complete search history.

(56) References Cited

U.S. PATENT DOCUMENTS

| 321,940 A | 7/1885 | Bauer |
| 1,488,450 A | 3/1924 | Dews |
| 4,717,301 A * | 1/1988 | Oddenino ........... B60R 13/0206 411/360 |
| 5,447,401 A * | 9/1995 | Jones .................. B60R 13/0206 411/411 |

(Continued)

FOREIGN PATENT DOCUMENTS

| EP | 0954993 A2 | 11/1999 | |
| GB | 2 087 229 | * 5/1982 | ............. A47G 27/04 |

(Continued)

OTHER PUBLICATIONS

European Search Report for European Patent Application No. 16167413 (dated Sep. 15, 2016) (8 Pages).

(Continued)

*Primary Examiner* — Michael P Ferguson
(74) *Attorney, Agent, or Firm* — Lucas & Mercanti, LLP (57) ABSTRACT

A device for removably connecting a lining layer to an inner shock-absorbing portion of a helmet, mainly made of foam is disclosed. The device includes a first element constrainable to the lining layer and a second element constrainable to the inner shock-absorbing portion. The second element has a threaded portion that can be inserted by screwing it in the foam of the inner shock-absorbing portion. The device also includes means for the mechanical snap-fit coupling between the first and the second element.

12 Claims, 4 Drawing Sheets

(56) References Cited

U.S. PATENT DOCUMENTS

| | | | |
|---|---|---|---|
| 5,930,840 A | 8/1999 | Arai | |
| 8,239,970 B2 * | 8/2012 | Ikeda | A42B 3/127 |
| | | | 2/267 |
| 8,800,065 B2 * | 8/2014 | Ikeda | A42B 3/328 |
| | | | 2/411 |
| 2003/0007845 A1 | 1/2003 | Gens | |
| 2009/0158506 A1 | 6/2009 | Thompson et al. | |
| 2011/0094071 A1 | 4/2011 | Veldhoen | |
| 2014/0096311 A1 | 4/2014 | Halldin | |

FOREIGN PATENT DOCUMENTS

| | | | | |
|---|---|---|---|---|
| JP | 2000-160424 | * | 6/2000 | A42B 3/127 |
| JP | 2000160424 A | | 6/2000 | |

OTHER PUBLICATIONS

Italian Search Report for Italian Application No. MI2015A000610. (dated Jan. 5, 2016)(2 pages).

* cited by examiner

DEVICE FOR CONNECTING A LINING LAYER OF A HELMET TO AN INNER SHOCK-ABSORBING PORTION OF A HELMET

CROSS-REFERENCE TO RELATED APPLICATION

This application claims the benefit of priority from Italian Patent Application No. MI2015A000610 filed Apr. 29, 2015 the contents of which are incorporated herein by reference.

FIELD OF THE INVENTION

The present invention relates to the field of protecting helmets, and in particular to the field of protecting helmets for users of vehicles, such as for example motorcycles, scooters, snowmobiles, etc.

BACKGROUND OF THE INVENTION

As known, such protecting helmets generically comprise an outer, hard protecting shell, one or more inner shock-absorbing portions (for example side cheek pads, an inner upper insert, the chin guard, etc.) that typically form an inner cap, usually made at least partially of a closed-cell foam (for example expanded polystyrene). Such inner portions are adapted to absorb the shock energy. A lining layer, usually in foam robber possibly covered with a fabric, is arranged on the inner surface of the shock-absorbing portion and is adapted to contact the user face. Such a lining layer allows making the contact comfortable between the helmet and the user face, in addition to allowing some fitting of the helmet to different shapes of the skull, being interposed between the user and the inner shock-absorbing portion and being elastically compressible within wide limits.

This lining layer is generally glued to the inner surface of the respective shock-absorbing portion of the helmet, thus making difficult the operations for cleaning and replacing the lining layer.

Alternatively, protecting helmets are known wherein the lining layer is totally, or partially, removably constrained to the inner surface of a shock-absorbing portion, for example through Velcro® or mechanical latches.

In case of use of mechanical latches, such as for example those for elastic interlocking of complementary parts, it is known to attach one or more plates, or other type of support, provided with at least one male part or female part of a mechanical latch (for example of elastic type), to the inner shock-absorbing cap through glues. The lining layer, conveniently provided with the complementary female or male part of the designed latches, can thus be removably fastened to an inner shock-absorbing portion of the helmet at such plates or supports.

Such a solution, still allowing the easy replacement or maintenance of the lining layer of a protecting helmet, is burdensome to implement, since the use of adhesives requires some care in the arrangement of plates or supports often inserted in seats expressly obtained in the respective inner shock-absorbing portion of the helmet and not always fully reliable, due to the degradation the adhesive layer can undergo with time.

In other embodiments of protecting helmets with the removable lining layer, the plates carrying the male or female part of the designed mechanical latches can be fastened to the inner shock-absorbing portion made of foam through comolding it with the same inner shock-absorbing portion.

Also in this case, such a solution is particularly burdensome to implement, due to the need of complex molds provided with temporary latches for the plates, or other supports of the mechanical latches, that have to be correctly positioned and restrained in the mold during the making of the inner shock-absorbing portion of the helmet.

SUMMARY OF THE INVENTION

Therefore, an object of the present invention is the implementation of a device that easily allows constraining and releasing the lining layer to/from the inner shock-absorbing portion of a helmet, without requiring burdensome implementation activities while ensuring high reliability.

A further object of the present invention is that such a device is cost effective and easy to manufacture.

According to the present invention, the device for removably connecting a lining layer of a helmet to the respective inner shock-absorbing portion mainly made of foam comprises a first element constrainable to the lining layer and a second element constrainable to the inner shock-absorbing portion. The second element comprises a threaded portion that can be inserted by screwing it in the foam of the inner shock-absorbing portion in order to realize the constraint between the inner shock-absorbing portion itself and the second element. The device further comprises means for the mechanical snap-fit coupling between the first and the second element.

Thanks to the present invention, the lining layer can be permanently and easily coupled to the inner shock-absorbing portion. In fact, the snap-fit coupling between the first element and the second element goes against an unwanted accidental detachment between the lining layer and the inner shock-absorbing portion. Furthermore, when a user wants to release the lining layer from the inner shock-absorbing portion, he simply has to apply a moderate force to the device of the present invention, in order to separate the two elements, by overcoming the strength of the snap-fit coupling.

It has to be noted that with the expression "mechanical snap-fit coupling", a particular mechanical coupling is intended here and in the following, between two complementary parts or however that can be inserted at least partially one into another, that ensures a permanent and reversible connection between the two parts, thanks to the elastic deformability of at least one portion of one of the parts that is deformed during the coupling and returns in a not deformed, or differently deformed, position able to apply the mutual restraint as the two parts are interference coupled.

According to an aspect of the present invention, the means for the mechanical snap-fit coupling comprise a female seat obtained on the afore said second element (or the first element) and a male protrusion obtained on the afore said first element (or the second element) reversibly constrainable inside the female seat.

In practice, such means for the mechanical snap-fit coupling substantially constitute a pressure button (or snap-fit button) having configuration known in the art, wherein for example the female seat comprises an elastic retaining frame, or portion, and the male protrusion comprises a groove reversibly retained by the afore said elastic frame of the female seat after its insertion in the latter, or wherein the female seat and the male protrusion are shaped to be mutually interlocked by interference of parts of which at least one is elastically deformable, or still wherein such male and female portions are similar to, or derived from, those of the button described in U.S. Pat. No. 321,940.

Such a configuration allows effectively taking advantage of the gaps inside the helmet and facilitates the operations for coupling and uncoupling the device parts.

According to a preferred aspect of the present invention, the afore said second element is substantially shaped as a screw having on its own head the female seat, or the male protrusion, of the afore said means for the mechanical coupling with the first element.

Such an embodiment is particularly easy to manufacture and store, in addition to be applied to the inner shock-absorbing portion made of foam of the helmet.

According to another aspect of the present invention, the second element comprises a foil for coupling to a surface of the inner shock-absorbing portion, and such a foil has the mentioned female seat (or male protrusion) of the mechanical coupling means.

According to an aspect of the present invention, the threaded portion of the second element has variable depth.

According to an aspect of the present invention, the ratio between maximum depth and thread pitch is comprised between 1.00 and 1.80, preferably between 1.20 and 1.60. A preferred value is equal to about 1.40.

According to an aspect of the present invention, the threaded portion has a ratio between inner diameter of the thread and maximum depth of the thread comprised between 0.15 and 0.5, preferably between 0.15 and 0.35. A preferred value is equal to about 0.23.

In general, the thread has maximum depth significantly larger than the inner diameter of the thread itself, i.e. the stem around which the helix forming the thread wraps up.

In particular, the inner diameter is as thin as possible so as to ensure the maximum deformability and compression compliance of the stem in case of shock, i.e. allowing an easy collapse thereof in case of shock however allowing having a thread with the strength needed for an easy screwing.

According to an aspect of the present invention, the threaded portion has a thread with variable thread angle, with minimum value comprised between 25 and 35 degrees (preferably equal to about 30 degrees) and maximum value comprised between 35 and 50 degrees (preferably equal to about 43 degrees).

According to an aspect of the present invention, the threaded portion has a thread with gradually decreasing depth.

These thread characteristics, preferably in combination one to another, allow an effective fastening of the second element in the inner shock-absorbing portion. The inner shock-absorbing portion is in fact, as mentioned, mainly made of expanded plastic material, for example EPS (known as expanded polystyrene) or EPP (known as expanded polypropylene) or expanded PU (polyurethane) or even EVA (ethylene vinyl-acetate).

According to an aspect of the present invention, the first element comprises coupling means to couple with two opposite surfaces of the lining layer.

Thanks to this, the first element can be effectively constrained to the lining layer, being arranged through the layer itself.

According to an aspect of the present invention, the device is made at least partly, or totally, of plastic material.

Such a solution allows keeping low the production costs of the device itself and implementing the particular thread configuration directly by molding.

BRIEF DESCRIPTION OF THE FIGURES

Referring to the accompanying figures, an exemplary and not limitative embodiment of the present invention is now introduced, in which.

DETAILED DESCRIPTION OF AN EMBODIMENT OF THE INVENTION

Referring in general to the accompanying figures, a device 1 for removably connecting the lining layer 12 of a protecting helmet, for example for motorcycle use, to a respective inner shock-absorbing portion 13 (from now on also inner portion 13) mainly or totally made of foam, such as for example expanded polystyrene or polypropylene, is described herein.

The connecting device 1 comprises a first element 2 and a second element 3 that can be mechanically coupled one to another.

In particular, the first element 2 can be constrained to the afore said lining layer 12 of a helmet and the second element 3 can be constrained to the inner shock-absorbing portion 13.

The inner shock-absorbing portion 13, as known in the art, is usually composed of closed-cells foam, typically arranged inside the outer casing (or outer cap) of the helmet, usually made of hard material such as polycarbonate or other thermoplastic material, such as ABS or fiber-reinforced composite material.

The lining layer 12, generally made of foam rubber covered with a fabric layer, is known in the art and is not discussed in detail herein. As previously mentioned, such a layer is intended to contact a user face and is typically thin, i.e. has reduced thickness as compared with the other two dimensions.

In the embodiment of the present invention shown herein, the first element 2 intended to be fastened to the lining layer 12 comprises a foil 2a from which a body 2b protrudes. Preferably, the foil 2a is circle-shaped and the body 2b has, in turn, a cylindrical shape, even if different shapes for the foil 2a and the body 2b can be used otherwise.

According to an aspect of the invention, the body 2b has a flange 2c substantially having a slab-shape, protruding from the side surface of the body 2b and lying on a plane substantially parallel to that on which the foil 2a lies.

It has to be observed that the foil 2a and the body 2b can be made in a single piece, for example of plastic material, or made in two separated parts that can be permanently and preferably irreversibly coupled one to another, for example by welding or mechanical interlocking.

A lining layer 12 of a protecting helmet can be constrained between the foil 2a and the flange 2c of the first element 2. In other words, the foil 2a can be into contact with a first surface 12a of the lining layer 12 and the flange 2c can be into contact with a second surface 12b opposite to the surface 12a of the lining layer 12.

Therefore the constraint between lining layer 12 and first element 2 can be a simple interlocking coupling, wherein the element 2 is forced into a through hole obtained in the lining layer 12.

In addition or alternatively, additional fastening means between the first element 2 and the lining layer 12 can be provided. For example, a lining layer 12 can be constrained by gluing to the first element 2. Referring to the herein shown embodiment, glue can be interposed for example between the foil 2a and the first surface 12a of the lining layer 12, and/or between the body 2b and the lining layer 12.

It has to be noted that, in alternative embodiments herein not shown, the element 2 can be made in any desired shape and size, provided that it can be constrained to the lining layer 12 of a protecting helmet in such a way that it has, as it will be seen, at least part of the means for snap-fit coupling with the second element 3 intended to be fastened to the inner portion 13 of the same protecting helmet.

In the herein depicted embodiment the first element 2, at the body 2b, has in addition part 4a of convenient means 4a, 4b for the mechanical snap-fit coupling with the second element 3, which are better discussed in the following.

The second element 3 has a threaded portion 3a, i.e. such a second element 3 is provided with a portion comprising a helical thread 3b that can be inserted by screwing it in the foam at least partly constituting the afore said inner portion 13 of the protecting helmet.

Accordingly, the threaded portion is shaped so as to be permanently constrainable by simple screwing to the inner portion 13. As mentioned, the inner portion 13 is mainly or totally made of foams, typically expanded polystyrene or expanded polypropylene, whereby it is preferred that the threaded portion 3a of the second element 3 has a non-conventional configuration adapted to "self-thread" the element 3 and ensure the latter is permanently anchored to the foam of the inner portion 13.

In particular, it is preferred that the thread 3b of the threaded portion 3a has thread 3b having higher pitch and depth compared to the standard screws.

Preferred parameters for the thread are listed below.

Preferably the thread 3b has variable depth H. Referring to the figures, the thread 3b has gradually decreasing depth H, with minimum value at the leading thread portion.

According to an aspect of the present invention, the ratio between maximum depth Hmax and pitch P of the thread is comprised between 1.00 and 1.80, preferably between 1.20 and 1.60. A preferred value is equal to about 1.40. In particular, in the embodiment shown such a value is equal to 1.374.

The ratio between inner diameter Di and maximum depth Hmax of the thread is preferably comprised between 0.15 and 0.5. More preferably, such a ratio is comprised between 0.15 and 0.35. A preferred value is equal to about 0.23. In the embodiment shown, such a value is equal to 0.228.

In general, as mentioned, the inner diameter Di is made as thin as possible so as to cause the deformation thereof in case of helmet shock, while ensuring however to the thread 3b a minimum structural resistance so that to allow the screwing thereof in the inner portion 13.

Preferably the thread angle α is in turn variable. The minimum value of α is comprised between 25 and 35 degrees (preferably is equal to about 30 degrees), whereas the maximum value of α is comprised between 35 and 50 degrees (preferably is equal to 43 degrees).

In the shown example, Hmax is equal to 6.575 mm, P is equal to 4.79 mm, Di is equal to 1.50 mm.

In addition, the second element 3 is preferably provided with a foil 3c. Similarly to the foil 2c of the first element 2, the foil 3c, preferably lying on a plane orthogonal to the axis of the threaded portion 3a, is intended to contact, directly or indirectly, an inner surface 13a of the inner shock-absorbing portion 13 of a protecting helmet. In fact, the same foil 3c can in turn hold a lining and/or finishing layer against the inner shock-absorbing portion 13, therefore still indirectly contacting the latter.

The second element 3 is further provided with part 4a of the means 4a, 4b for snap-fit coupling with the first element 2 and, in particular, with the part 4a of such coupling means made or however implemented on the first element 2.

Preferably, the means 4a, 4b for the snap-fit coupling between the first and the second element 2, 3 of the device 1 comprise a protrusion 4a and a respective seat 4b, which have a substantially complementary shape, so as to realize a male-female coupling.

Typically, the second element 3 is larger than the first element 2, whereby the female seat 4b is arranged on such a second element 3.

However, embodiments in which the first element 2 is provided with a female seat and the second element 3 with a male protrusion, are not excluded.

At least one of the parts 4a, 4b of the mechanical snap-fit coupling means should have an even minimal elastic deformability to allow the interlocking coupling of the male protrusion 4a in the female seat 4b and the permanently and reversibly restraint in such a coupling position. For example, the walls of the female seat 4b and/or those of the male protrusion 4a can respectively elastically widen or narrow in order to then return, or tend, to their undeformed configuration after the mutual coupling, so as to ensure the mutual fastening, even if reversible, of the two elements 2 and 3 of the connecting device 1, on which such mechanical snap-fit coupling means 4a, 4b are made or obtained.

It has to be observed that configurations of such means 4a, 4b different from the above described one can be alternatively used in the device 1, provided that they still allow a so called "mechanical snap-fit coupling" between the first and the second elements 2, 3.

It has to be remembered that with such an expression of "mechanical snap-fit coupling", a mechanical coupling is intended between two usually complementary parts, for example male and female ones, which is able to ensure a permanent and reversible connection between the two parts, thanks to the elastic deformability of at least one portion of one of the parts that is deformed during the coupling and returns in a not deformed, or less or differently deformed, position so as to able to apply the mutual restraint as the two parts are interference coupled.

Turning back to the embodiment of the present invention shown in the figures, the female seat 4b of the snap-fit coupling means 4a, 4b is arranged next to the foil 3c of the second element 3 preferably, but not necessarily, in alignment with the threaded portion 3a of the latter. The seat 4b is therefore shaped as a concave opening inside the foil 3c.

In the embodiment herein depicted, it has to be observed that the second element 3 is substantially shaped as a common screw having however, on its own head, a female seat 4a of a mechanical snap-fit coupling 4a, 4b.

Figure 2:
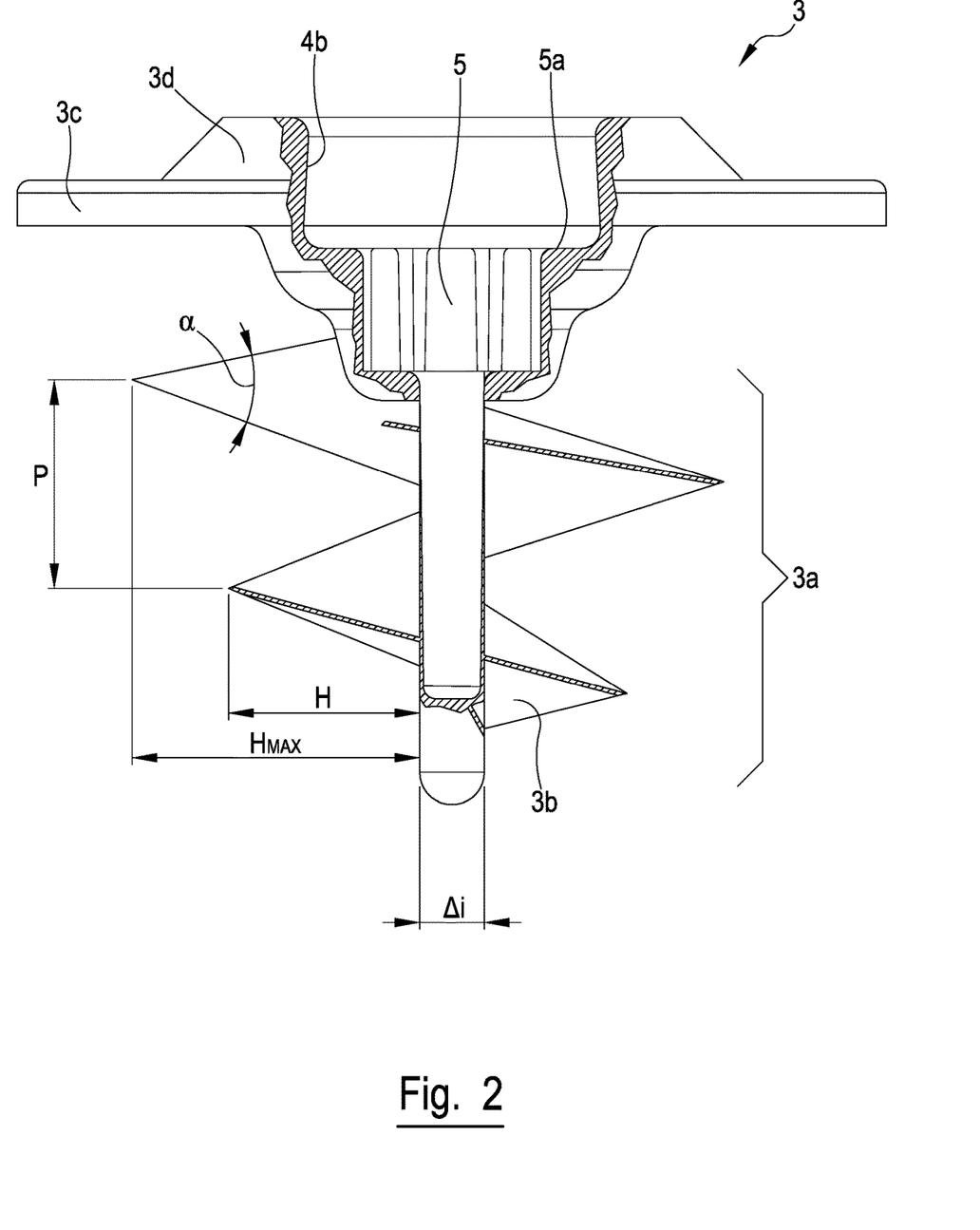
FIG. 2 is a side partial cross-sectional view of an element of the device of FIG. 1.
Figure 3:
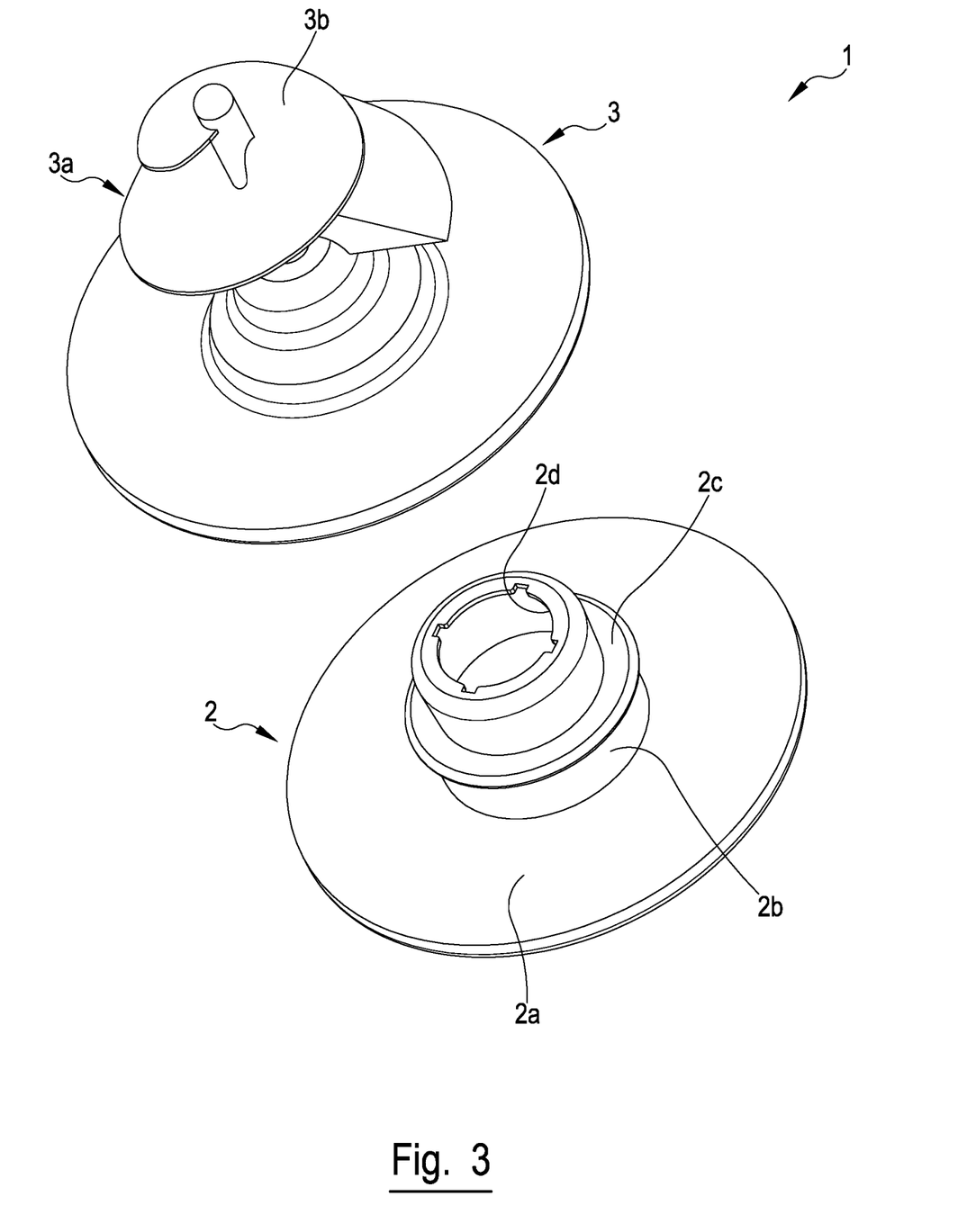
FIGS. 3 and 4 are perspective views of the device of FIG. 1, according to two different angles.
Figure 4:
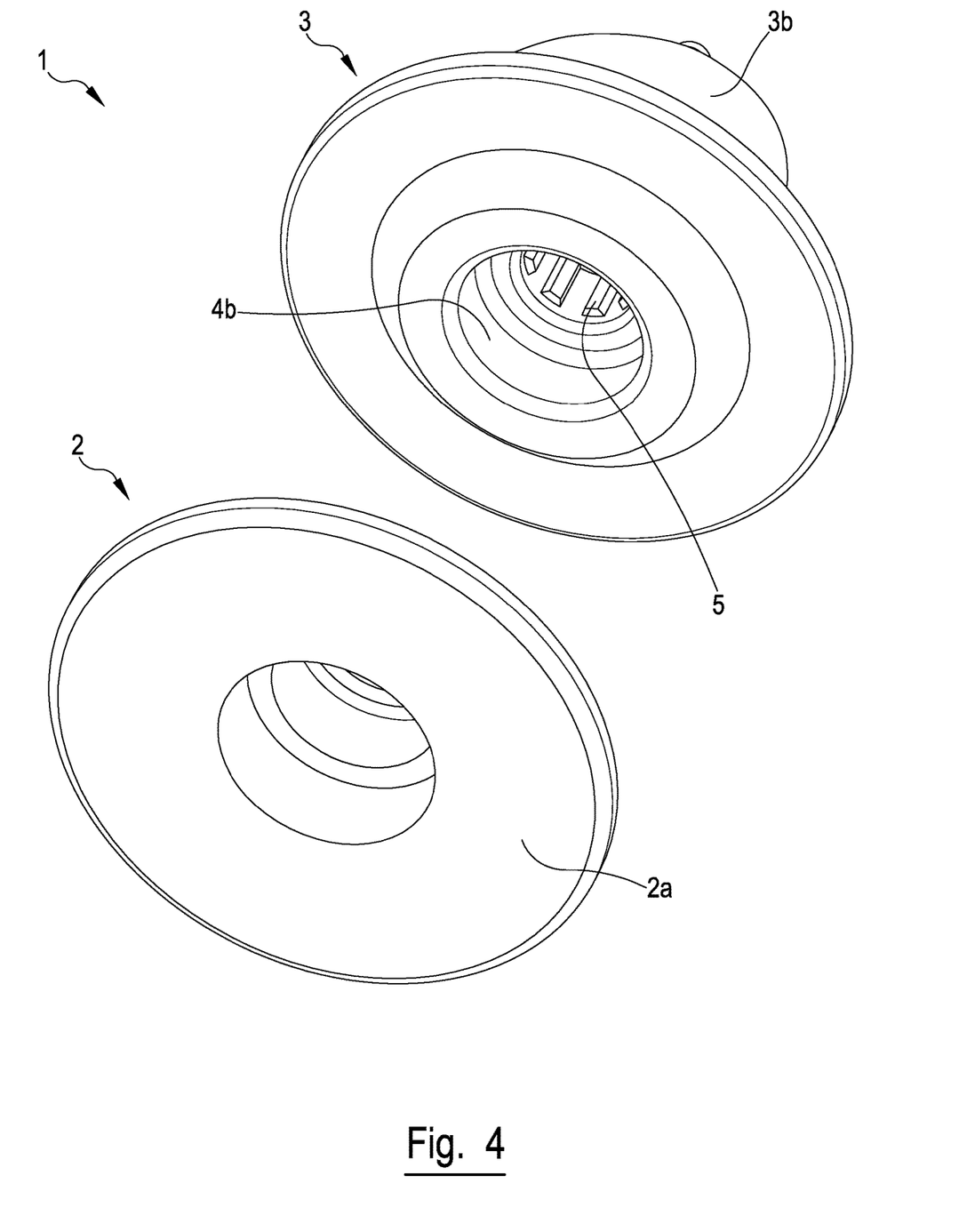

Typically, the female seat 4b has a substantially cylindrical shape. In order to achieve the snap-fit coupling with the protrusion 4a, the seat 4b is preferably tapered or however has at least two diameters at different heights differing from one another. The "height" is measured along a direction parallel to the axis of the threaded portion 3a, and is growing proportionally to the distance from the threaded portion. Referring to FIG. 2, the "height" is a vertical axis oriented towards the top of the sheet.

In a substantially complementary way, in the embodiment of the herein shown invention the male protrusion 4a has a substantially cylindrical shape and is preferably tapered so that to promote the interlocking by interference of parts with the seat 4b, once such a protrusion 4a has been inserted into the seat 4b.

Alternatively, or in combination with the tapering, the protrusion 4a can have a diameter only slightly larger than the diameter of the seat 4b so that, in presence of a given elastic deformability of the walls of the seat 4b or of the same protrusion 4a, the afore said reversible interlocking by interference of parts can be achieved, i.e. the mechanical snap-fit coupling between such parts of the means 4a, 4b.

According to a particular aspect of the invention, the upper edge 3d of the seat 4b protrudes from the foil 3c. The definition "upper" is intended with reference to the operating mode of the device 1, whereby "upper" denotes the portion shown on top in the accompanying figures.

Underneath the seat 4b, there is preferably an additional opening 5 arranged coaxially with the thread 4b. Therefore the opening 5 connects to the seat 4b. Referring to the previously described orientation, the upper edge 5a of the opening 5 is arranged at the lower surface of the seat 4b.

The opening 5 is preferably shaped in such a way to cooperate with a tool for screwing the second element 3 in the foam of the inner portion 13. In the embodiment shown herein, the opening 5 has a six-pointed star shape.

In order to allow the coupling of a screwing tool with the opening 5 even when the first element 2 is coupled with the second element 3 (i.e. when the protrusion 4a is inserted in the seat 4b), the body 2b of the first element 2 can be preferably hollow. In other words, the body 2b of the first element 2 can have a through opening 2d crossing the whole length of the body 2b, including the protrusion 4a.

The device 1 can be made of different materials. Preferably the device 1 is, all or partly, made of plastic, for example polyamide or acetal resin.

During the assembling step, the second element 3 is screwed in the inner portion 13 of a helmet or over covering/finishing elements thereof or else in the side cheek pads and/or the chin guard, for example with the aid of a screwdriver inserted in the opening 5.

Conversely, the first element 2 is constrained to a lining layer 12, for example by inserting the body 2b in a hole of the lining layer, so that to couple the foil 2a with a first surface 12a of the lining layer 12 and the flange 2c with a second surface 12b, which is opposite to the first surface 12a, of the lining layer 12. As mentioned, in addition the first element 2 can be glued to the lining layer 12.

In use, the snap-fit coupling means 4a, 4b are reversibly coupled one with another, in such a way to constrain the lining layer 12 to the inner portion 13. Referring to the embodiment of the invention shown herein, the protrusion 4a is inserted in the respective seat 4b by moving the former towards the latter, as shown by the arrow in FIG. 1.

Figure 1:
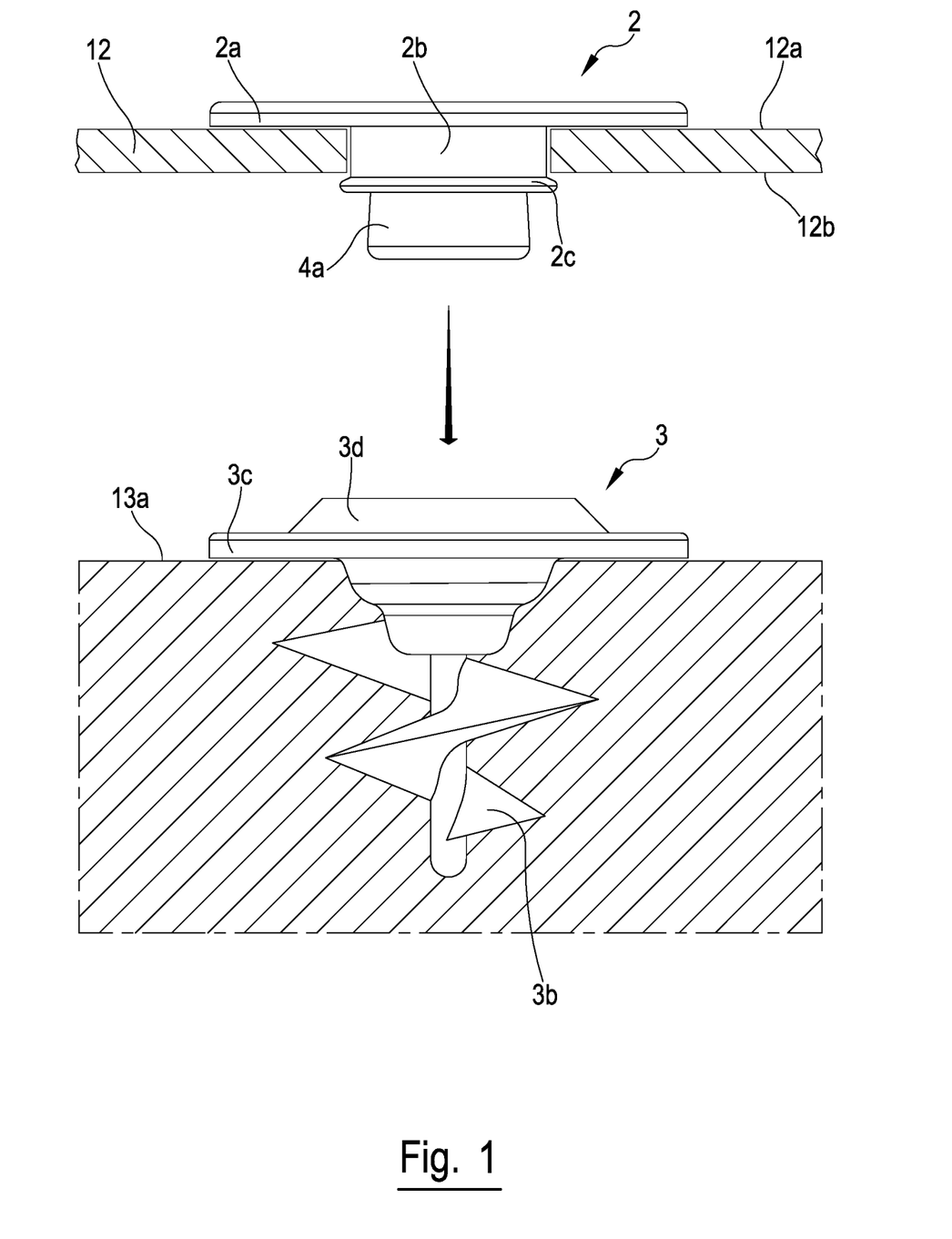
FIG. 1 is a schematic view of a device according to the present invention in use.

The previously described configuration of the seat 4a keeps the protrusion 4b in place.

When the user wants to release the lining layer 12 from the inner portion 13, he/she applies a force on the first element 2, leading it away from the second element 3. When such a force is enough to release the protrusion 4b from the seat 4a, the lining layer 12 can be removed from the inner portion 13.

For ease of description, a single device 1 for constraining the lining layer 12 to the inner portion 13 has been referred so far. In reality, it is preferred using a plurality of devices 1 conveniently arranged on the lining layer 12 and on the inner portion 13 in order to constrain the former to the latter.

The invention claimed is:

1. A device removably connected to a lining layer and an inner shock-absorbing portion of a helmet, said device comprising:
    a first element fixed to said lining layer; and
    a second element fixed to said inner shock-absorbing portion, said inner shock-absorbing portion being made from foam;
    wherein said second element comprises a threaded portion screwed into the foam of said inner shock-absorbing portion;
    wherein said first element and said second element are adapted with a snap-fit coupling means configured to mechanically couple said first element to said second element and positioned on a side of said second element opposite from said threaded portion, said snap-fit coupling means comprising a female seat made on said second element and a male protrusion made on said first element, said male protrusion being, reversibly constrainable in said female seat;
    wherein the second element rem rises an additional peening connected to and disposed within said female seat, said additional opening having an upper edge arranged at a lower surface of the female seat and being shaped in such a way to matingly cooperate with a tool for screwing the second element into the foam of the inner shock-absorbing portion;
    wherein said threaded portion has a thread having a ratio between an inner diameter (Di) of the thread and a maximum depth (Hmax) of the thread comprised between 0.15 and 0.5; and
    wherein said thread is a thread with a variable thread angle ($\alpha$), with a minimum value comprised between 25 and 35 degrees, and a maximum value comprised between 35 and 50 degrees.

2. The device according to claim 1, wherein said second element comprises a foil for coupling to a surface of said inner shock-absorbing portion, said foil having said female seat.

3. The device according to claim 1, wherein said threaded portion of the second element has a thread having variable depth.

4. The device according to claim 1, wherein the ratio between the maximum depth (Hmax) and a thread pitch of said threaded portion is between 1.00 and 1.80.

5. The device according to claim 4, wherein the ratio between the maximum depth (Hmax) and the thread pitch of said threaded portion is between 1.20 and 1.60.

6. The device according to claim 4, wherein the ratio between the maximum depth (Hmax) and the thread pitch of said threaded portion is about 1.40.

7. The device according to claim 1, wherein said threaded portion has a thread with a gradually decreasing depth (H).

8. The device according to claim 1, wherein said first element has coupling means to couple to two opposite surfaces (12a, 12b) of said lining layer.

9. The device according to claim 1, made at least partially of plastic material.

10. The device according to claim 1, wherein the ratio between the inner diameter (Di) and the maximum depth (Hmax) of the thread of said threaded portion is between 0.15 and 0.35.

11. The device according to claim 1, wherein the ratio between the inner diameter (Di) and the maximum depth (Hmax) of said threaded portion is about 0.23.

12. The device according to claim 1, wherein said first element abuts said lining layer, and said second element abuts said inner shock-absorbing portion.

\* \* \* \* \*